3,489,807
PROCESS FOR THE PRODUCTION OF FLUORINATED OLEFINIC COMPOUNDS
Haruo Shingu, 38, Higashi Kishimoto-cho, Shimokamo, Sakyo-ku, and Makoto Hisazumi, 1, Rokutanda-cho, Fukakusa, Fushimi-ku, both of Kyoto, Japan
No Drawing. Continuation-in-part of applications Ser. No. 183,372, Mar. 29, 1962, and Ser. No. 575,187, Aug. 25, 1966. This application Feb. 9, 1968, Ser. No. 704,236
Int. Cl. C07c 25/14
U.S. Cl. 260—649          1 Claim

ABSTRACT OF THE DISCLOSURE

A process for preparing phenyl trifluoroethylene together with α,α'-difluorostilbene by pyrolytically reacting phenyl chlorofluoromethane and chlorodifluoromethane in the presence of superheated steam.

---

This application is a continuation-in-part of Ser. No. 183,372, filed Mar. 29, 1962 and Ser. No. 575,187, filed Aug. 25, 1966, both applications now abandoned.

This invention relates to a process for the production of unsaturated fluorine-containing aromatic compounds. In particular, the invention relates to the processes for synthesizing phenyl trifluoroethylene from conventional fluorinated lower molecular compounds by simultaneously pyrolyzing the latter compounds in suitable combination to produce ethylenic linkage intermolecularly under elimination of two moles of hydrogen chloride.

Phenyl trifluoroethylene is an important and highly valuable monomer and its polymers have also been described in U.S. Patent No. 2,651,627. However, the methods employed for the preparation of this interesting material have been very costly and inefficient, particularly in large capacity production, so that its commercial application has not yet been realized.

It is well-known that aromatic chlorides, such as benzal chloride, benzyl chloride, and so forth are far more susceptible to hydrolysis than the aliphatic chlorides. It is therefore surprising that a homologue such as benzal fluorochloride, a starting material of this invention, is not hydrolyzed with superheated steam at pyrolytic temperatures to produce a large amount of oxygenated by-products but together with chlorodifluoromethane is converted at high yields and substantially without hydrolysis into phenyl trifluoroethylene together with α,α'-difluorostilbene.

It is an object of this invention to provide a method generally applicable for the production of fluorinated ethylenic aromatic compounds in high yield and efficiency suitable for large scale application.

Still another object of this invention is to provide a novel and commercially attractive method for the production of phenyl trifluoroethylene along with α,α'-difluorostilbene.

According to this invention, a process is provided for preparing phenyl trifluoroethylene together with α,α'-difluorostilbene which comprises pyrolytically reacting chlorodifluoromethane and phenyl chlorofluoromethane at a temperature from aout 500 to 950° C. in the presence of superheated steam, pyrolytically reacting a mixture consisting essentially of not more than 50% by volume of phenyl chlorofluoromethane and chlorodifluoromethane at a temperature between 600 and 800° C. in the presence of about 60 to 80.6% by volume of the total reaction mixture of superheated steam and recovering phenyl trifluoroethylene together with α,α'-difluorostilbene.

The process also comprises pyrolytically reacting a mixture consisting essentially of not more than from 28 to 68.5 percent by volume of phenyl chlorofluoromethane and from 72 to 31.5 percent by volume chlorodifluoromethane at a temperature between 600 and 800° C. in the presence of about 60 to 80.6 percent by volume of the total reaction mixture of superheated steam and recovering phenyl trifluoroethylene together with d,d'-difluorostilbene.

The reaction of the present invention is carried out in one reaction tube maintained at appropriate temperature into which the reaction components are introduced as a mixture or separately with suitable preheating. According to the present invention the reaction can be effected most preferably in the presence of superheated steam which is previously heated in a separate coil or chamber and is injected into the reaction zone in a definite proportion to effect a suitable dilution of the reaction components and appropriate heat supply to the reaction zone. Thus, the presence of superheated steam permits highly selective and efficient yield of the ethylenic compound to be obtained with a minimum production of less desirable by-products such as high boiling telomeric substances containing more hydrogen and chlorine. The effect is more prominent in the present invention than in the case of the pyrolysis of chlorodifluoromethane to produce tetrafluoroethylene previously observed by the present inventors (Japanese Patent No. 276,088).

The reaction conditions employed in the present invention are varied depending on the selection of the reaction components. Generally speaking, they are similar to those for the single pyrolysis of each component. The reaction temperature ranges from 600° to 800° C. Atmospheric or slightly subatmospheric reaction pressure is preferred to superatmospheric. The mole ratio of the reaction components to be co-pyrolyzed in the method of the present invention is an important factor which controls the composition of the reaction product, and can be varied in wide ranges according to the product composition desired as is illustrated in the following example. Another important factor is the proportion of steam to be introduced to the reaction zone which controls the extent of the by-product formation arising mainly from the telomerization of olefinic intermediates with hydrogen chloride as a telogen. In most cases the presence of more than 50% by volume of steam in the reaction mixture is preferable.

The method of the present invention is illustrated in the following example:

EXAMPLE

Synthesis of phenyl trifluoroethylene

Phenyl chlorofluoromethane (prepared from benzal chloride and stibium trifluoride, boiling point 93° C./65 mm. Hg, 87° C./57 mm. Hg, 69° C./32 mm. Hg) was copyrolyzed with chlorodifluoromethane in the presence of superheated steam in an electrically heated silica tube at temperatures ranging from 600 to 800° C. with varying feed compositions and other reaction conditions. The product gas mixture was first treated with a water-scrubber where the hydrochloric acid formed and high-boiling product were separated. The low-boiling liquid and condensable gaseous products were then separated in a trap cooled with Dry Ice and methanol. Finally the non-condensable gas was collected in a gasometer. The high-boiling portion of the product was fractionated under reduced pressure to yield phenyl trifluoroethylene (B.P. 64–65° C./65 mm. Hg), phenyl chlorofluoromethane (B.P. 89–95° C./65 mm. Hg), benzal chloride (B.P. 100–103° C./33 mm. Hg) and α,α'-difluorostilbene (B.P. 140–150° C./10 mm. Hg; M.P. 70–73° C.). Benzal fluoride was also found to be contained in the phenyl trifluoroethylene fraction in minor amount which was estimated by determining the bromine number of the fraction. Lower-boiling portions and non-condensable gaseous products were analyzed and determined by gas-chromatographic technique.

In Table 1 the results of a series of runs showing the effect of the feed composition are indicated. The reaction conditions common to these runs are: reaction temperature 700° C., space velocity 3000 (steam excluded), steam concentration 60% by volume of the total reaction mixture.

Table 2 shows the effect of steam concentration upon the yield of phenyl trifluoroethylene. This series of runs was conducted at a reaction temperature of 700° C., space velocity of 3000, feed composition of 50% phenyl chlorofluoromethane and 50% chlorodifluoromethane.

In Table 3 there is indicated a salient feature of the effect of reaction temperature. The reaction conditions common to this series of runs are: space velocity 3000, steam concentration 60% by volume, feed composition of 50% phenyl chlorofluoromethane and 50% chlorodifluoromethane.

TABLE 1

| Composition of the feed in percent | | Conversion in mole percent | Selectivity in mole percent of the total conversion | | | |
|---|---|---|---|---|---|---|
| $C_6H_5CHFCl$ | $CHClF_2$ | | $C_2F_4$ | $C_6H_5CF=CF_2$ | $(C_6H_5CF)_2$ | $C_6H_5CHCl_2$ |
| 28 | 72 | 26.7 | 40.8 | 16.1 | 11.1 | 3.5 |
| 50 | 50 | 34.4 | 31.3 | 34.3 | 19.8 | |
| 68.5 | 31.5 | 34.1 | 7.7 | 41.9 | 24.6 | 16.0 |
| 100 | 0 | 38.0 | | | 81.0 | |

TABLE 2

| Steam concentration in percent by volume | Conversion in mole percent | Selectivity in mole percent of the total conversion | | | |
|---|---|---|---|---|---|
| | | $C_2F_4$ | $C_6H_5CF=CF_2$ | $(C_6H_5CF)_2$ | $C_6H_5CHCl_2$ |
| 29.8 | 40.3 | 20.4 | 19.1 | 27.2 | |
| 56 | 34.4 | 31.3 | 34.6 | 19.8 | |
| 63 | 27.1 | 23.0 | 35.6 | 15.0 | 13.6 |
| 80.6 | 18.5 | 23.8 | 42.8 | 12.9 | 19.8 |

TABLE 3

| | Conversion in mole percent | Selectivity in mole percent of the total conversion | | | |
|---|---|---|---|---|---|
| | | $C_2F_4$ | $C_6H_5CFCF_2$ | $(C_6H_5CF)_2$ | $C_6H_5CHCl_2$ |
| Temperature, °C.: | | | | | |
| 640 | 18.5 | 8.9 | 51.8 | 18.0 | 21.2 |
| 700 | 27.1 | 23.0 | 35.6 | 15.0 | 13.6 |
| 750 | 56.3 | 27.6 | 27.6 | 16.2 | 6.1 |

What is claimed is:

1. A process for preparing phenyl trifluoroethylene together with α,α'-difluorostilbene which comprises pyrolytically reacting a mixture consisting essentially of from 28 to 68.5% by volume of phenyl chlorofluoromethane and from 72 to 31.5% by volume of chlorodifluoromethane at a temperature between 600 and 800° C. in the presence of about 60 to 80.6% by volume of the total reaction mixture of superheated steam and recovering phenyl trifluoroethylene together with α,α'-difluorostilbene.

References Cited

UNITED STATES PATENTS 2,994,723   8/1961   Scherer et al. _____ 260—653.3

FOREIGN PATENTS 3,515,353   10/1960   Japan.
402,132    2/1965    Japan.

BERNARD HELFIN, Primary Examiner

H. T. MARS, Assistant Examiner

U.S. Cl. X.R.

260—651, 653.3